United States Patent
Hangleiter et al.

[11] Patent Number: 6,099,193
[45] Date of Patent: Aug. 8, 2000

[54] COMPOSITE BODY

[75] Inventors: Christof Hangleiter, Hermaringen; Bernhard Trier, Germering; Michael Trunz, Ellwangen, all of Germany

[73] Assignee: Carl-Zeiss-Stiftung, Heidenheim, Germany

[21] Appl. No.: 09/209,831

[22] Filed: Dec. 11, 1998

[30] Foreign Application Priority Data

Dec. 13, 1997 [DE] Germany ............................ 197 55 482

[51] Int. Cl.[7] .............................. B25G 3/34; B32B 17/00
[52] U.S. Cl. .............................. 403/268; 403/30; 403/37; 359/896
[58] Field of Search ................................. 403/30, 37, 265, 403/268, 267, 266; 248/223.41; 359/820, 896

[56] References Cited

U.S. PATENT DOCUMENTS

| | | | |
|---|---|---|---|
| 4,518,446 | 5/1985 | Drennan | 156/63 |
| 4,721,541 | 1/1988 | Hodges | 156/89.14 |
| 4,826,303 | 5/1989 | Meier . | |
| 5,163,770 | 11/1992 | Soma et al. | 403/30 |
| 5,669,997 | 9/1997 | Robbert et al. | 156/101 |
| 5,807,014 | 9/1998 | Goto | 403/268 |
| 5,846,638 | 12/1998 | Meissner | 428/220 |
| 5,877,903 | 3/1999 | Adachi | 359/820 X |

FOREIGN PATENT DOCUMENTS 3934546  4/1991  Germany .

*Primary Examiner*—Terry Lee Melius
*Assistant Examiner*—John R. Cottingham
*Attorney, Agent, or Firm*—Walter Ottesen

[57] ABSTRACT

The invention relates to a composite body which is assembled of at least two bodies. The first body is made of a first material and the second body is made of a second material. Each of the two bodies has at least one connecting surface and these connecting surfaces are mutually adjacent. The two connecting bodies are wrung upon each other on at least one connecting surface. The two connecting surfaces are connected to each other by wringing and on at least one of these two surfaces, one or more recesses are provided for an adhesive location or an adhesive gap. An adhesive ensures an additional adhesive connection of the two connecting surfaces at the adhesive location between the two bodies. These recesses of the adhesive locations lie at least essentially in the wringing surface.

16 Claims, 3 Drawing Sheets

COMPOSITE BODY

FIELD OF THE INVENTION

The invention relates to a composite body which is made by joining at least two bodies together. The first body consists of a first material and the second body consists of a second material. Each of the two bodies has at least one connecting surface and the connecting surfaces lie opposite each other. Both connecting bodies are wrung to each other on at least one connecting surface.

BACKGROUND OF THE INVENTION

For certain applications, the body to be produced should have only minimal deformations after the assembly (the permissible range of deformation lies in the nanometer range). These applications include the production of larger bodies made of several individual bodies. The minimal deformations are preferably at the mirrored surfaces, measurement surfaces or support surfaces for other components. Not only is the size of the body to be produced relevant, but especially its form, such as inner edges. The application of these bodies is preferably in areas wherein nanometers are a relevant size such as in microscopy, astronomy, et cetera.

Essentially two methods are known in the state of the art of fine assembly technology for joining two bodies tightly to each other. These methods are presented as (a) and (b) below.

(a) When bodies are wrung to each other, optical surfaces are joined to each other via the van der Waal forces. Wringing is primarily used for force-tight temporary connections in manufacture. It is a disadvantage in this method that the two bodies joined by wringing easily separate because of liquids which wet the connecting edges. Wringing is also not necessarily resistant to vibration.

In production, wringing is used as a permanent connection for small optical elements having dimensions in the millimeter range. Large elements having dimensions in the centimeter range cannot be joined in this manner with the reliability required for a permanent connection.

Wringing can be improved and be made more reliable by means of a holding lacquer and/or an adhesive material outside of the wringing surfaces in order to increase the durability of the connection. However, the connection cannot be perfected.

(b) When applying adhesive in the absence of tension, the adhesive locations are usually optimized by a clever configuration of the adhesive locations (optimization of the adhesive gap and the adhesive pads). With this optimization, basic requirements (adhesive gaps $\frac{1}{10}$ mm, pads 6×6 mm) are considered in accordance with the state of the art.

Glued parts have the significant disadvantage that a force-tight and form-tight connection is not necessarily possible. The unavoidable creeping of the connection and the maladjustment of the parts to each other caused thereby likewise generates corresponding problems in some applications.

U.S. Pat. No. 4,826,303 discloses an arrangement for connecting at least two bodies with the bodies being connected to each other via a wedge-shaped connecting member without thermal constraining forces occurring. This arrangement has the disadvantage that both bodies must be reworked after being joined because the wedge-shaped connecting member generates intense forces at the connecting surfaces. On the other hand, this connection is very stable.

German patent publication 3,934,546 shows an arrangement for adhesive-connecting two bodies by means of intermediate pieces. The intermediate pieces are placed up to the surfaces of the two bodies and the surface cannot be used in those regions.

SUMMARY OF THE INVENTION

It is an object of the invention to provide a connection between two larger bodies and especially bodies having low thermal coefficients of expansion (such as silicate, ceramic, Invar and the like). It is a further object of the invention to develop such a connection which is adequately satisfactory for processes and is force-tight as well as satisfies tolerance requirements in the nm range.

A combination of the two joining techniques described in accordance with the state of the art has not been realized up to now and is also not evident because of the two types of joining have been long known and have tended to be mutually exclusive.

The invention provides the very significant advantage that the force, which occurs because of the shrinkage of the adhesive, is used to improve the wringing, while, on the other hand, it hardly leads to deformations of the joined bodies.

A judicious form of the adhesive location as well as a judicious selection of the arrangement of the adhesive location within the wringing surface supports the advantageous combination of the two joining types.

With the new connection, it is possible to force-tight join optical elements to each other having large dimensions, that is, greater than 10 cm. Experiments have been made wherein the surfaces to be connected had a longitudinal expansion of more than 40 cm. The creeping of the adhesive is avoided because creeping is prevented by the wringing. The necessary strength is ensured by the adhesive locations.

The invention is suitable especially in optical devices, which operate with low wavelengths, because of the slight deformations of the joined bodies because of the adhesive connection. Exemplary of such devices is a positioning table having movements along the X and Y axes and sometimes also along the Z axis as is especially necessary in ultraviolet microscopes. In a preferred embodiment, such a device is part of a wafer chuck of a wafer stepper or a wafer scanner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
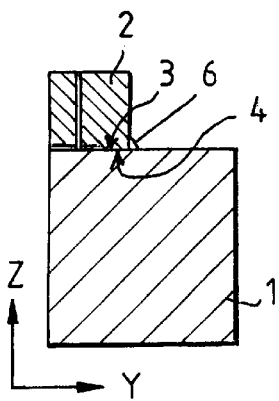
FIG. 1 is a side elevation view, in section, showing two parts joined to each other in accordance with the invention.
Figure 2:
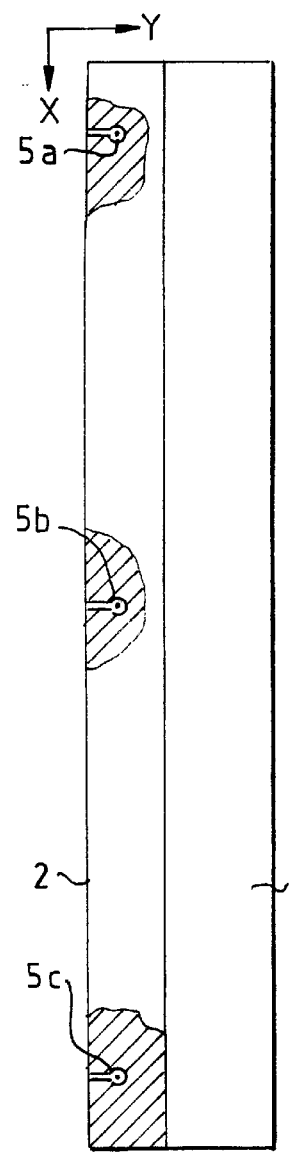
FIG. 2 is a plan view of the two bodies of FIG. 1.

FIG. 1 shows two bodies (1, 2) in section along the Z-Y axes and the two bodies are joined to each other in accordance with the invention. FIG. 2 shows a plan view along the X-Y axes of the same bodies (1, 2).

Both bodies (1, 2) are made of one and the same material. Materials suitable are especially silicate, ceramic (for example, Zerodur) and metals (such as Invar) having a low thermal coefficient of expansion.

The two bodies (1, 2) lie one atop the other on their respective contact or connecting surfaces (3, 4). The contact surfaces (3, 4) are so precisely worked that they can be connected to each other via wringing. One can characterize the two surfaces as wringing surfaces (3, 4). Adhesive locations or adhesive pads (5a, 5b, 5c, 7) are arranged within the wringing surfaces (3, 4) in order to achieve an improvement of the adherence between the two bodies (1, 2).

An adhesive channel 6 is arranged around the wringing surfaces (3, 4) which is intended to prevent a wetting of the wringing edges. The adhesive channel 6 is only introduced at the wringing edges at which they present no hindrance for the later use of the joined bodies (1, 2).

Figure 3:
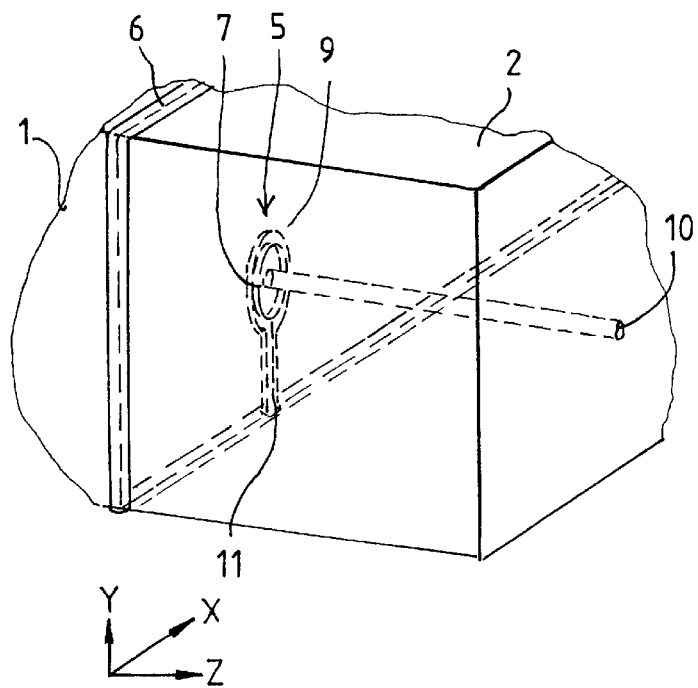
FIG. 3 is a three-dimensional perspective view of an adhesive location in the interior of the two bodies.
Figure 4:
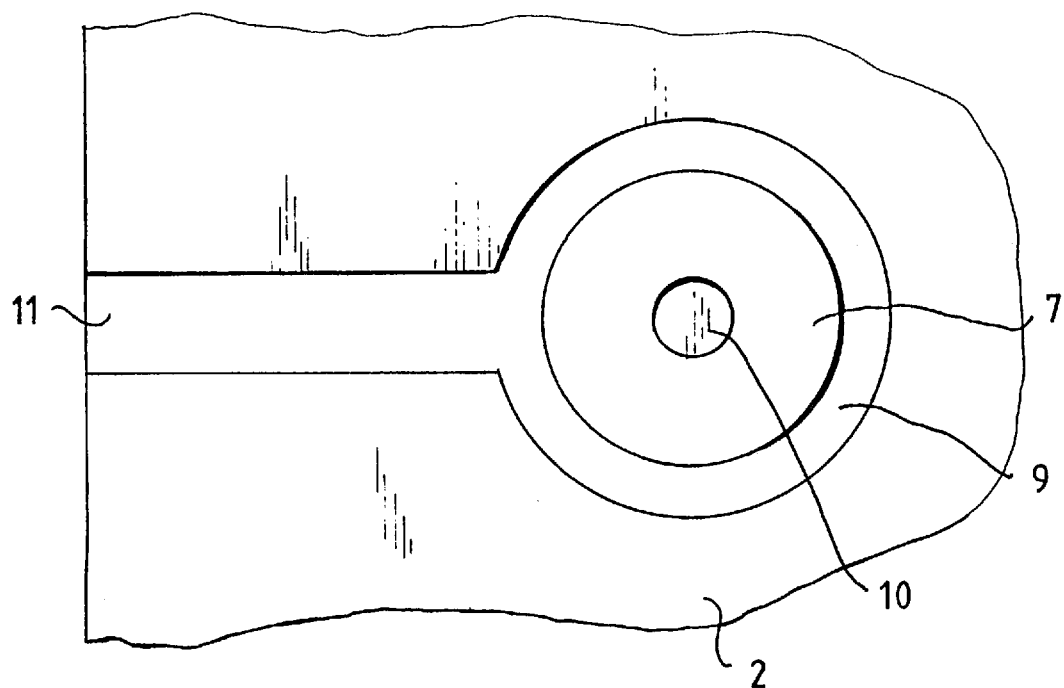
FIG. 4 is a plan view of the adhesive location.
Figure 5:
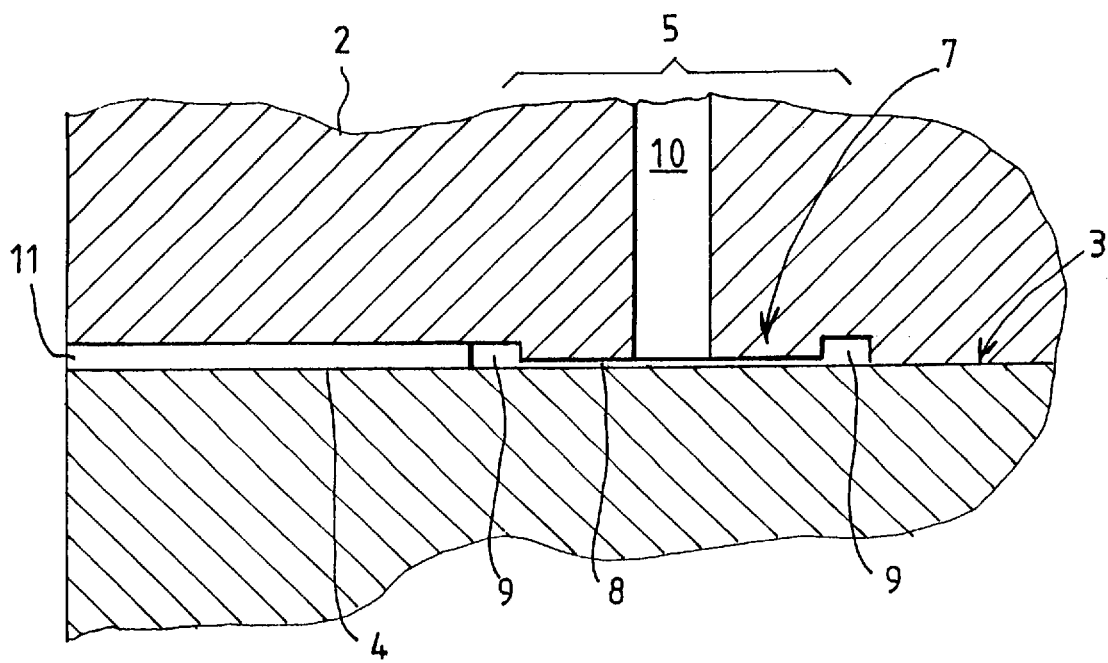
FIG. 5 is an enlarged lateral sectional view through the adhesive location.

These adhesive locations 5 are explained in greater detail in FIGS. 3 to 5.

An adhesive location 5 comprises a planar surface 4 and a counter surface 3 into which all cutouts, which are required for an adhesive connection, are machined.

These cutouts in surface 3 are especially a flat circularly-shaped adhesive pad 7 having a defined adhesive gap 8. The adhesive pad 7 is surrounded by a thicker circularly-shaped clear cut 9 for delimiting the adhesive gap 8. With this clear cut 9, the adhesive (which spreads into the adhesive gap 8 via capillary forces) is limited to the region of this adhesive gap 8. A cylindrically-shaped channel 10 terminates in the adhesive pad 7, preferably at its center point. The channel 10 is provided for introducing the adhesive under overpressure. A rectangularly-shaped channel 11 is provided for venting the gases developed during curing of the adhesive. This channel 11 extends from the clear cut 9.

This adhesive feed channel 10 should be as short as possible so that the necessary overpressure for introducing the adhesive should must not be too high. Furthermore, the necessary overpressure at the channel 10 can be reduced by applying an underpressure at channel 11.

If the adhesive gap 8 is 0.1 mm thick and has a diameter of 6 mm, then the clear cut 9 should have a diameter which is 2 mm greater and should be larger than 0.5 mm. The volume ratio of the adhesive location 5 to the clear cut 9 then is 1:4. This volume ratio should not be less than 1:3.

In this example, the clear cut 9 is surrounded by approximately 69% of the wringing surfaces (3, 4) because the venting channel 11 terminates in the clear cut 9. The venting channel 11 is, in turn, enclosed on both sides by the wringing surfaces (3, 4) up to its outlet from the two bodies.

The rectangularly-shaped channel 11 for venting the gases developed during curing of the adhesive should have a width twice the width of the clear cut 9 and have the same height. With this dimensioning, its length must, however, also be considered in order to ensure good venting. The channel 11 can be smaller when the adhesive location 5 is close to the edge of the two bodies (1, 2) to be joined and must be selected to be larger when the adhesive location 5 is located farther in the interior of the two bodies (1, 2).

The cylindrically-shaped channel 10 for introducing the adhesive has, in this example, a radius of ¼ of the radius of the adhesive pad 7 and should be as short as possible. The dimensioning of the channel 10 should be selected also in dependence upon the viscosity of the adhesive used.

Figure 6:
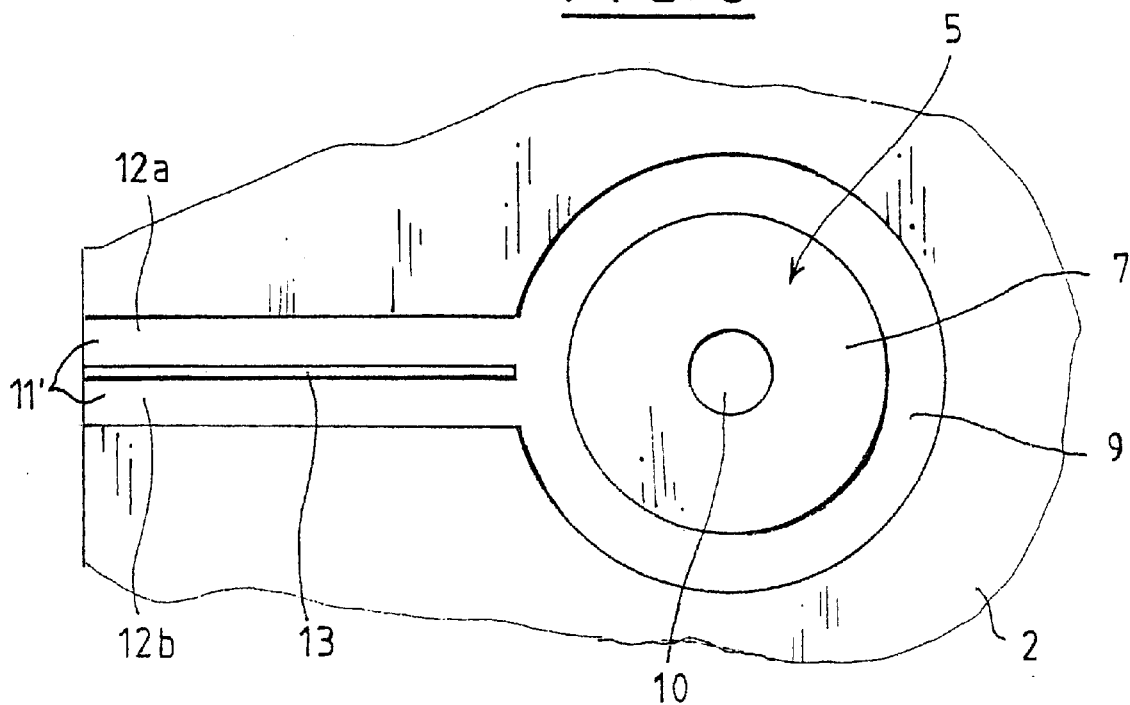
FIG. 6 is a plan view of a variation of the adhesive surface shown in FIG. 4; and, FIG. 7 is a front view of the venting channel of FIG. 6.
Figure 7:
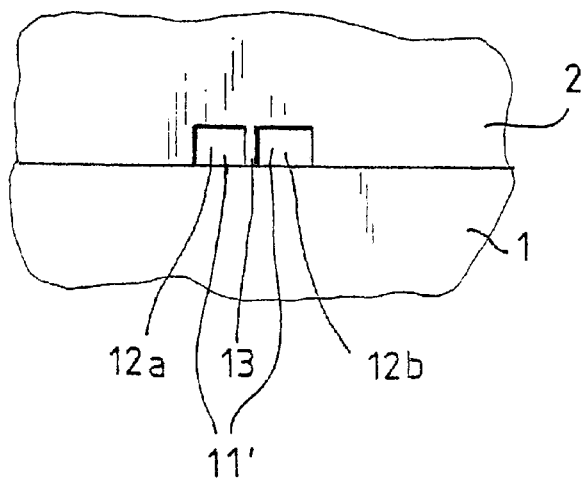

If the adhesive location 5 is very far into the interior of the two bodies (1, 2), then the rectangularly-shaped channel 11 for venting during curing of the adhesive cannot be allowed to become too large. This is achieved in that the channel 11 is modified as shown in FIGS. 6 and 7.

A partition wall 13 can be inserted in the center of the channel 11' thereby providing two channels (12a, 12b) which terminate in the clear cut 9. In the one channel 12a, a gas such as air can be blown in which can escape via the other channel 12b. In this way, a directed gas flow around the adhesive pad 7 is generated in the clear cut 9 whereby the size of the venting channel 11' can be held to reasonable limits even for a very long length.

To increase the adhesive strength, one surface of the adhesive pad 7 or both mutually adjacent surfaces can be roughened slightly. Whether this is purposeful is dependent also upon the viscosity of the adhesive used and upon the thickness of the adhesive gap and or the width thereof because the adhesive should fill out the entire adhesive pad 7 up to the clear cut 9.

If an adhesive, which hardens under ultraviolet radiation, is used, then it can be purposeful to at least partially mirrorize the walls of the venting channel (11, 11') and the clear cut 9 in order to additionally introduce UV light to the adhesive pad 7 via the venting channel (11, 11').

Theoretically, it is possible not to provide a channel 10 for introducing the adhesive when an adhesive is used which, after being introduced, only cures because of external action (for example, warming, incident UV light radiation, et cetera). This can be done by increasing the volume of the adhesive as may be required. The correct adhesive process in then triggered after a time delay. However, here the quantity of adhesive metered is very critical.

If, in this process, no venting of the adhesive occurs, then the channel (11, 11') for venting the adhesive location (5) is not needed. If no change in volume occurs during curing of the adhesive, then it is theoretically possible to also eliminate the surrounding clear cut 9.

The two bodies (1, 2) which are to be joined can be of different materials. In this case, the thermal coefficient of expansion of these materials is to be considered when selecting the materials. Especially ceramic or glass material are used as materials for carrying out the invention as mentioned above.

The placement of the adhesive pad 7 within the wringing surfaces (3, 4) is important for the strength of the connection between the two bodies (1, 2). The flat venting channel (11, 11') is also especially advantageous as is the round channel 10 for introducing the adhesive. The venting channel provides good venting and the channel 10 introduces the least possible resistance to the introduction of the adhesive.

The round adhesive pad 7 having a channel opening in its center ensures a clean flow of the adhesive as well as a tension-free adhesive location. The adhesive locations are preferably placed at the elevation of the shear center to minimize the deformation of the bodies to be joined.

The recesses for carrying out the application of the adhesive are machined into one of the contact surfaces in the above example because this is simpler from a manufacturing point of view. It is understood that a portion of the recesses can also be machined into the opposite-lying contact surface.

In the embodiment, the transition between the second body 2 and the first body 1 (that is, the inner edge) must be precisely at right angles because the first vertical freestanding wall of the second body 2 is mirrored and serves for position measurements of the assembled body (1, 2).

However, it is impossible from a manufacturing viewpoint to produce a precise interior right angle on a homogeneous body. For this reason, the body to be produced comprises two individual bodies (1, 2) which are joined to a single part. The adhesive locations were described especially with respect to FIGS. 3 to 5 (wherein they were identified by reference numeral 5) and are placed at the joining surfaces (connecting surfaces) (3, 4). The body (1, 2) which results is characterized by a very high precision as to form while simultaneously having a high resistance with respect to thrusts.

The body (1, 2) described above is a support plate 1 for an X, Y, Z positioning table utilized in microscopes. These microscopes utilize radiation in the UV range for controlling the part to be investigated. Position tables of this kind with their support plates 1 must be stable with respect to form to the highest degree while at the same time having a high strength which permits rapid movements of the table especially in an automatization of the control tests.

In all of the diagrams shown in the FIGS. it should be noted that the correct size proportions are not shown. Especially all adhesive gaps are very much smaller than shown because the adhesive is intended to flow via the capillary force into these adhesive gaps and an adhesive gap should not have a width which exceeds a few tenths of a millimeter.

The desired force reduction can be supported by an appropriate selection of the adhesive having the smallest possible shrinkage. This shrinkage should be less than 10% and preferably less than 3% and this shrinkage should preferably be even less than 1% and less than 0.6% would even be better. As an adhesive, all adhesives are suitable which exhibit a smallest possible shrinkage and which make possible a reliable adhesion to the material of the bodies to be joined. For the preferred materials (silicate and ceramic), the adhesive is especially an epoxy adhesive having a shrinkage of less than 3% or less than 0.6%.

The adhesive feed channel should preferably be as clear of adhesive as possible after completing the application of the adhesive.

The adhesive locations in the wringing surfaces between the two bodies to be joined do not primarily serve the connection of the two bodies to be joined to each other; instead, the adhesive locations secure the wringing during intense accelerations or changes therein. The holding force of the adhesive locations therefore has to be especially fully effective only when the bodies, which are to be joined, want to separate at their connecting surfaces. This can take place at different degrees of rapidity depending upon the geometry of the composite body and on the position of the connecting surfaces relative to the direction or directions of acceleration.

In the embodiments shown in FIGS. 1 to 7, the clear cut can be in one body and the recess for providing the adhesive gap can be formed in the opposite-lying body.

These modifications, however, have the disadvantage that a more precise adjustment of the two bodies, which are to be joined to each other, must take place when wringing. In special cases, however, this solution can be advantageous.

It should be noted that the adhesive feed channel can also be lead through the other one of the bodies to be joined to the adhesive gap and the venting channel can be in the interior of the body, far away from the connecting surfaces. For reasons of thermal stability, all components of the composite body should be of the same material. To measure the position of the composite body, portions of its surface can be mirrored.

In lieu of joining the two bodies at their two connecting surfaces directly to each other, a cavity between the two bodies can be provided at the adhesive locations in which a third body assumes the connection between the two bodies to be joined. This third body (with a lower modulus of elasticity as may be required) can be secured with adhesive to the two bodies to be joined in an axis perpendicular or parallel to the connecting surfaces. Here too, and as required, a channel for supplying adhesive and a channel for pressure compensation can be used.

It is understood that the foregoing description is that of the preferred embodiments of the invention and that various changes and modifications may be made thereto without departing from the spirit and scope of the invention as defined in the appended claims.

What is claimed is:

1. A composite body comprising:

a first body made of a first material and a second body made of a second material;

said first and second bodies having first and second joining surfaces, respectively;

said first and second joining surfaces being mutually adjacent and in wringing contact engagement with each other to define a first adhesive connection between said first and second bodies;

at least one recess formed in one of said joining surfaces so as to lie essentially therein and defining an adhesive location;

an adhesive to provide a second adhesive connection between said first and second bodies at said adhesive location;

a first channel formed in at least one of said first and second bodies for introducing said adhesive to said adhesive location;

said adhesive location defining an internal flat circular-cylinder shaped adhesive region; and, an outer circular cylindrical clear cut disposed in surrounding relationship to said adhesive region.

2. A composite body comprising:

a first body made of a first material and a second body made of a second material;

said first and second bodies having first and second joining surfaces, respectively;

said first and second joining surfaces being mutually adjacent and in wringing contact engagement with each other to define a first adhesive connection between said first and second bodies;

at least one recess formed in one of said joining surfaces so as to lie essentially therein and defining an adhesive location;

an adhesive to provide a second adhesive connection between said first and second bodies at said adhesive location;

said first and second joining surfaces defining an interface and said interface having an outer periphery; and, a third channel extending about said interface to close off said interface at said periphery and said third channel holding an adhesive.

3. The composite body of claim 2, further comprising a first channel formed in at least one of said first and second bodies for introducing said adhesive to said adhesive location.

4. The composite body of claim 3, further comprising a second channel formed in at least one of said first and second bodies to permit said adhesive location to communicate with a location outside of said first and second bodies thereby permitting air to reach said adhesive location; and, said second channel being configured to vent said adhesive location.

5. The composite body of claim 3, said first channel having a circular cross section.

6. The composite body of claim 4, said second channel having a rectangular cross section.

7. The composite body of claim 1, said first and second joining surfaces defining an interface and said interface having an outer periphery; and, a third channel extending about said interface to close off said interface at said periphery and said third channel holding an adhesive.

8. The composite body of claim 7, said third channel being a slot extending along said periphery.

9. The composite body of claim 1, said first and second joining surfaces surrounding said adhesive location.

10. The composite body of claim 1, said bodies conjointly defining a shear center; and, said adhesive location being disposed at the elevation of said shear center of said two bodies.

11. The composite body of claim 2, said adhesive location defining an internal flat circular-cylinder shaped adhesive region; and, an outer circular cylindrical clear cut disposed in surrounding relationship to said adhesive region.

12. The composite body of claim 4, said second channel extending to said clear cut.

13. The composite body of claim 12, said adhesive region being on said first joining surface and said adhesive region and said second joining surface conjointly defining a gap; and, said clear cut having a thickness greater than said gap by a factor lying in the range of 3 to 5 and said second channel having a thickness greater than said gap by a factor lying in the range of 3 to 5.

14. The composite body of claim 13, said clear cut and said second channel having equal thicknesses.

15. The composite body of claim 2, said first and second bodies conjointly defining a shear center; and, said adhesive location being disposed at the elevation of the shear center of said two bodies.

16. The composite body of claim 1, said adhesive region and said clear cut conjointly being surrounded by a first peripheral line and an imaginary adhesive region without a clear cut having a second peripheral line and the ratio of said first peripheral line to said second peripheral line being at least 50%.

* * * * *